Figures 1, 2:
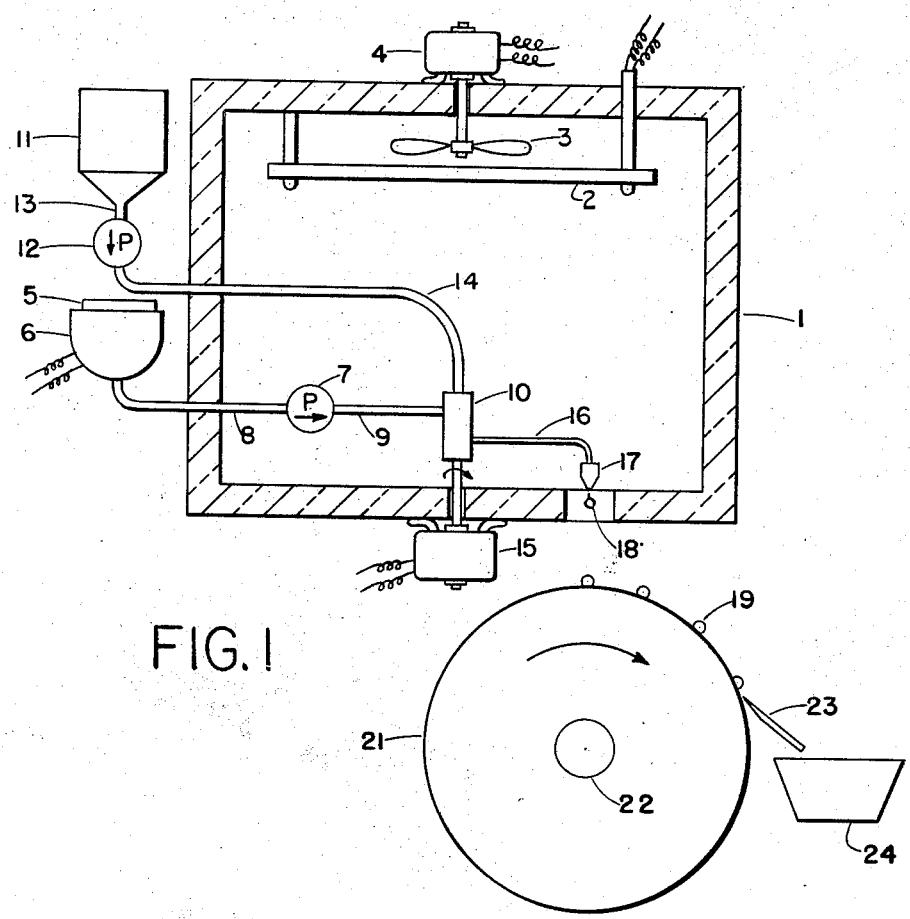

Oct. 21, 1958 T. H. SCHULTZ ET AL 2,857,281
PRODUCTION OF FLAVORING OIL COMPOSITIONS
Filed Feb. 7, 1956

INVENTORS
T. H. SCHULTZ, A. H. BROWN
& L. H. WALKER.
BY
ATTORNEYS

# United States Patent Office 2,857,281
Patented Oct. 21, 1958

2,857,281

PRODUCTION OF FLAVORING OIL COMPOSITIONS

Thomas H. Schultz, Lafayette, Amon H. Brown, El Cerrito, and Leander H. Walker, Berkeley, Calif., assignors to the United States of America as represented by the Secretary of Agriculture Application February 7, 1956, Serial No. 564,087

9 Claims. (Cl. 99—140)

(Granted under Title 35, U. S. Code (1952), sec. 266)

A non-exclusive, irrevocable, royalty-free license in the invention herein described, throughout the world, for all purposes of the United States Government with the power to grant sub-licenses for such purposes, is hereby granted to the Government of the United States of America.

This invention relates to and has among its objects the provision of novel flavoring compositions and methods for producing them. A general object of the invention concerns the preparation of solid flavoring compositions which serve as convenient sources of flavor and in which the active flavoring principles are effectively "locked-in," that is, the flavoring principles are completely surrounded by an edible, solid, impermeable protective substance whereby the composition may be stored for long periods of time without loss of flavoring value through vaporization or deterioration of the flavoring principles. A specific object of the invention concerns the preparation of flavoring compositions having the above-mentioned properties and possessing a particular dimensional form, namely, in the form of globular particles. The objects of the invention thus include the provision of the compositions in such globular form and the method for producing the compositions of such form. Further objects and advantages of the invention will be evident from the description herein.

In the accompanying drawing which illustrates an apparatus for carrying out the process of the invention as well as the product resulting therefrom, Fig. 1 is an elevation, partly in cross-section, of an apparatus for carrying out the process of the invention, and Fig. 2 is an elevation on a greatly enlarged scale of a globular particle of the stabilized flavoring composition produced in accordance with this invention.

It is well known in the food industry that the characteristic flavoring agents of various fruits and other plant materials may be isolated in concentrated form as oils or essences. Such principles are herein referred to generically as volatile flavoring agents. For example, methods of obtaining orange oil, lemon oil, apple essence, pineapple essence and so on have been developed and are being applied on a commercial scale. These volatile flavoring agents are useful in many instances for supplementing the flavor of various food products. However, these liquid preparations are not particularly suitable for incorporation with solid food products, dehydrated fruit juices, for example, because of resulting exposure of the flavoring liquid. Thus on storage of such products, losses occur due to vaporization and/or chemical alteration, e. g., oxidation of the flavoring principles. Vaporization causes a complete loss of flavoring power whereas chemical deterioration causes either a loss of flavoring power, or more usually, development of undesirable off-flavors in the liquid, e. g., development of a turpentine-like flavor in orange or lemon oils on storage due to oxidation of labile compounds in these oils.

By proceeding in accordance with this invention, the liquid flavoring agents are made up into solid form so that they are eminently suitable for enhancing the flavor of many different types of foodstuff, particularly for fortifying the flavor of solid products made by dehydrating fruit juices.

The solid compositions in accordance with this invention have the advantage that the volatile flavoring agent is locked in the solid composition, that is, it is stabilized and trapped in the solid composition so that even on prolonged storage the flavoring agent is not lost by vaporization nor does it undergo deterioration. A further advantage of the products of this invention is that when they are contacted with water as in utilizing them for ultimate consumption, the flavoring agent is released as minute globules throughout the liquid preparation. Thus, for instance, when dehydrated orange juice fortified with the product of this invention is reconstituted by addition of water, the flavoring agent (orange oil) is released as minute globules, a substantial portion of which will dissolve in the reconstituted juice and the remainder of which will exist as minute globules suspended in and dispersed throughout the volume of the juice. Thus the resulting reconstituted juice has a natural appearance and a uniform flavor. Such a result is to be contrasted to a situation wherein on reconstitution the oil would be released in a single body or in large particles in which case the oil would float to the top of the juice, giving it an unnatural oily surface and an extreme concentration of oil at the top of the juice and virtually no oil in the body thereof.

It has been proposed heretofore to prepare flavoring compositions by emulsifying the flavoring agent with a molten edible base, cooling the resulting composition to solidify it, then grinding it into small particles suitable for incorporation with solid food products such as dehydrated orange juice. One disadvantage of this prior method is that during the grinding or crushing step, some of the flavoring agent is lost by vaporization. More important, when the mass is disintegrated, each particle will contain a portion of its flavoring agent content at the surface of the particles. This is an inevitable result of the crushing or grinding operation since every division of the mass having therein a uniform dispersion of flavoring agent will result in particles having some flavoring agent on their surfaces. This surface portion of the flavoring agent is naturally subject to loss by vaporization and deterioration by chemical agencies as it is not locked in the matrix of the carrier mass but merely on the surface. To remedy this situation, it is advisable in the known process to remove the surface fraction of the flavoring agent by subjecting the crushed product to a vacuum for a substantial period of time. This vacuum treatment results in removal of the surface fraction of the flavoring agent without removal of the portion of the flavoring agent which is actually dispersed within the edible base. The vacuum-treated product is then useful as a convenient source of flavor and the flavoring agent in it is locked in and protected from vaporization and deterioration.

One advantage of this invention is that the particles of stabilized flavoring composition are prepared without applying any crushing or grinding step. This gives the advantage that the loss of flavoring agent concomitant with grinding or crushing operations is prevented. Another point is that the prior crushing or grinding operation invariably leads to the formation of dust-like or fine particles in a greater or lesser percentage of the total material treated. Such fine material has little practical utility and is generally discarded. In the instant invention, no grinding or crushing is applied and no fines are produced.

A further advantage of this invention is that the need for vacuum treatment to remove flavoring agent on the surface of the particles is eliminated, since in the process of this invention the flavoring agent does not appear on the surface of the particles of the final product. As a result the production of the stabilized flavoring composition according to this invention is simpler, faster, more efficient, and the loss of flavoring agent during processing is decreased.

In general, the process of the invention involves forming a hot, liquid emulsion of a volatile flavoring agent, such as citrus oil, in a sugar base, preferably a non-crystallizing mixture of at least two different sugars and a minor proportion of water. The hot, liquid emulsion is forced through an orifice into the atmosphere, preferably into an atmosphere of low humidity, at such a rate that the emulsion issues from the orifice as a stream of droplets, preferably droplets formed to have a diameter from about 0.02" to about 0.2". The issuing stream of droplets is caused to impinge upon a solid surface, preferably after permitting the droplets to descend a distance of about ½ to 8 inches in free fall, while they are still in a plastic condition, whereby the impingement, that is, the impact of the droplets on the surface, causes the droplets to form globular particles on the said surface, which surface, preferably, is moving in a direction essentially normal at the point of impact to the direction of the stream fall whereby the globular particles are spaced along, and retained on, the surface, while being cooled and solidified on the surface until they retain their shape, and thereafter collected. Preferably, the flavoring composition, from the time of formation of the droplets to the time of collection of the globular particles, inclusive, is exposed to an atmosphere of low humidity.

The solid flavoring composition provided by the invention comprises a solid emulsion of minute globules of a volatile, liquid flavoring agent, such as citrus oil, uniformly dispersed throughout a continuous phase of a solid, essentially amorphous sugar base. The composition is in the form of small, generally globular particles which are circular in horizontal cross-section and in vertical cross-section have convex sides and top and an essentially planar base. The entire surface of the particles, except for the planar base, is curvate, and the particles are free from angles, edges, protuberances, and other frangible formations. The particles, furthermore, have a smooth, non-tacky, imperforate surface, a non-fragile, vitreous, hard and strong texture, en masse they form a free-flowing, pourable product without any tendency for interlocking individual particles, and are capable of withstanding the impact and abrasion stress of packaging, dispensing, and shipping without breaking. The flavoring agent contained in the particles is thus stabilized and protected from vaporization and deterioration even when stored for long periods of time.

The production of stabilized flavoring compositions in accordance with this invention may involve various alternative modifications. By way of illustration but not limitation, the production may include a sequence of operations as described below:

(a) Initially there is prepared a hot liquid emulsion of the volatile liquid flavoring agent in an edible carrier base. Thus by way of example, orange oil is vigorously agitated with a hot, liquid sugar base containing mostly sucrose together with a minor amount of corn syrup solids and water thus to produce an emulsion of orange oil in the hot, liquefied sugar base.

In preparing the compositions of this invention it is preferred that the carrier base consist principally of a sugar or mixture of sugars. The advantage of using a sugar base is that it enables one to produce an end product in which the base is in an amorphous state. In such state the base exhibits a maximum ability to protect the entrapped flavoring principle from vaporization and deterioration. The advantages of an amorphous product are explained at greater length hereinafter. However, if desired, one may use as the carrier base other edible solid materials which may be melted without decomposition as, for example, sorbitol, alpha methyl glucoside, beta methyl glucoside, or mixtures of these.

(b) The hot liquid emulsion of the flavoring agent in the carrier base is then forced through an orifice into the atmosphere. The size of the orifice and the pressure applied are so regulated and correlated with the other conditions (for example, composition, temperature, viscosity, etc. of the emulsion) that the emulsion emerges into the atmosphere in the form of a stream of droplets. That is, the stream is not a continuous, connected body of liquid but rather consists essentially of individual droplets separated from one another.

(c) The stream of droplets while still in a plastic condition is caused to fall upon a solid surface. Preferably the solid surface takes the form of an endless belt of stainless steel or a drum having a polished metallic surface. As the droplets impinge upon the surface they form globular particles.

During the operation of impinging the droplets on the surface, the surface is continuously traversed in a plane normal to the fall of the droplets and at a speed sufficient to cause the globular particles to be spaced along the surface. The globular particles are permitted to remain on the surface until they are cooled sufficiently to be essentially solid and to retain their shape. To assist in the cooling, the surface may be refrigerated. For example, if a drum is used as the surface, a refrigerated medium may be circulated through its interior. The solidified globular particles are then removed from the surface, for example, by the use of a doctor blade or the like.

(d) In same cases the droplets issuing from the orifice may have thread-like elements of the composition connecting the individual droplets. In such event these thread-like elements will largely break away from the globular particles as they are formed on the surface. Some of the thread-like elements may, however, remain protruding in random directions from individual particles or even interconnecting individual particles. Where this occurs, the cooled globular particles may be subjected to a sifting operation. During the sifting the thread-like members having a very narrow cross-section break apart readily and will pass through the sieve, whereas the globular particles will retain their original size and shape and remain on the sieve.

The globular particles of stabilized flavoring composition possess many advantages. For one thing, they contain the flavoring agent in locked-in condition so that the particles may be held indefinitely in storage with no substantial loss or deterioration of flavoring agent. In this respect the globular shape of the particles means that they have close to ideal shape for protection of the flavoring agent in that they exhibit a virtually minimum ratio of surface area to volume. A distinct advantage of the product of this invention is that the globular particles are especially free-flowing and can be readily poured from containers like ball bearings, buck shot or other spherical particles. This property is of great advantage in dispensing measured quantities of the product into containers of food or the like. The product has such good pouring qualities that it can even be dispensed by automatic weighing devices. A further advantage of the products of this invention is that their globular shape gives the particles substantial strength. Thus the particles may be poured from one vessel to another, subjected to vibratory and impact stresses as in shipping the product, etc. all without breakage of the particles. This is a distinct advantage as any breakage would result in exposure of flavoring agents to air whereby loss and deterioration of the flavoring agents would be made possible. In contrast to the products of this invention, products made by crushing or grinding of masses of flavoring compositions result in formation of irregular particles having sharp corners, narrow edges, projecting points, etc., all of which make for a product which is easily broken on subjection to the usual mechanical stresses of packaging, shipping, etc. and which therefore leads to decrease in stability of the flavoring principles in the product.

A further distinct advantage of the product of this invention is that the method by which the particles are formed is particularly adapted to give a particle in which the flavoring agent is not present on the surface but is only contained in the body thereof and in which the surface of the particle is of a dense and nonporous nature. This situation is explained further as follows:

Initially the flavoring agent, such as orange oil, is emulsified with the hot carrier base, for example, sugar. There is thus formed a composition in which there is a continuous phase of the sugar base with minute particles of the oil dispersed uniformly throughout the continuous phase. When this emulsion is extruded through the orifice and formed into droplets, the skin of each droplet will consist only of sugar base rather than a material containing both sugar base and oil. Thus by the effect of surface tension, as the drops are formed the oil is forced inwardly from the surface of the droplet leaving a microscopically thin surface layer of the droplet entirely free from oil. These droplets are then solidified without any dividing action so that the globular particles possess the same characteristic of having this thin, oil-free sugar base skin. This means that the outer surface of each globular particle is dense and non-porous so that the oil within each particle is protected to a maximum extent from penetration of air or other deleterious influences. By contrast, such a situation cannot be achieved by prior method. Thus if a solidified emulsion of the oil in a sugar base is broken up by crushing, grinding or the like, the surface of each particle will be the same as the interior, i. e., a matrix of the base containing minute globules of the oil dispersed throughout the matrix. Such a surface is necessarily porous, particularly after the surface oil disappears by vaporization leaving a multitude of minute pores or orifices in the surface of each particle.

The production of the novel compositions of this invention is further explained below in connection with a description of the apparatus depicted in the accompanying drawing and procedural aspects of the invention:

Referring to Fig. 1 of the drawing, the device includes a container 1 made of asbestos, glass fibers or other insulating material. For maintaining the interior of container 1 at the desired temperature there is provided a series of electrical strip-heaters 2 and fan 3 driven by electrical motor 4. The fan 3 circulates air between heaters 2 (which are spaced from one another) and about the space within container 1.

The carrier base is held in hopper 5, surrounded by electrical heating mantle 6 which serves to keep the base at the desired temperature and degree of fluidity. The hot liquid base is forced by pump 7 into mixer 10 via tubes 8 and 9. Pump 7 is preferably equipped with a variable speed drive so that the rate of flow can be controlled.

The volatile flavoring agent (such as orange oil) is kept in hopper 11 and is forced by pump 12 into mixer 10 via tubes 13 and 14. Pump 12 is preferably provided with a variable speed drive so that the rate of flow of the oil can be regulated.

Within mixer 10, actuated by variable speed electric motor 15, the oil and molten base are intimately commingled to form a hot liquid emulsion, the base forming the continuous phase and the oil forming the dispersed phase.

The hot emulsion of oil and carrier base is forced through tube 16 into nozzle 17. The rate of flow and the internal diameter of nozzle 17 are so correlated that the emulsion issues from the nozzle as a stream of droplets 18.

Beneath nozzle 17 is provided rotating hollow drum 21 mounted on hollow axle 22. Means is preferably provided for circulating a refrigerant within the drum through axle 22. Drum 21 is rotated by conventional means such as a variable speed electric motor.

The droplet stream falls on the surface of drum 21, each individual droplet 18 forming a globular particle 19 having a somewhat flattened base 20 (see Fig. 2). The speed of drum 21 is so regulated that the particles 19 are spaced along the periphery of the drum.

As drum 21 continues to rotate in a clockwise direction, the globular particles 19 cool and solidify. The solidified particles are dislodged by doctor blade 23 and fall into hopper 24. Thus by continuously forcing the hot emulsion out of nozzle 17 and causing the droplets to impinge on drum 21 and continuously rotating the drum, the globular particles 19 are produced in a continuous manner.

If desired the carrier base and flavoring oil may be formed into a hot emulsion in equipment other than described above. For example, a pre-formed hot emulsion may be directly pumped into nozzle 17 and processed subsequently as above described. It is preferred however to form the emulsion continuously and immediately prior to extrusion through the nozzle because when such is done loss of flavoring oil through vaporization and/or deterioration is minimized. Where a preformed hot emulsion is used, the oil is subjected to heat for a longer period of time and vaporization and deterioration are more likely to occur.

The invention is further demonstrated by the following examples wherein parts are by weight:

EXAMPLE I

A mixture of 100 parts sucrose, 50 parts corn syrup (approx. 55% dextrose equivalent) and 26 parts water was boiled until the solution had a boiling point of 150° C. This sugar base was cooled to 130° C. (at which temperature it was still liquid) and 10 parts of orange oil was incorporated therein with vigorous agitation. The resulting hot emulsion was pumped through an orifice having an internal diameter of $\frac{1}{16}$ inch at a rate of 1.35 cc. per minute. The pump, connecting tubing, and orifice were in a container wherein the temperature was maintained at about 150° C. The hot emulsion emerged from the orifice in the form of a droplet stream, the individual droplets having a diameter of $\frac{1}{8}$ inch.

The droplet stream was allowed to fall in air a distance of 2 inches onto a sheet of stainless steel traversed in a horizontal plane. There was formed on the sheet a series of globular particles spaced apart a distance of about $\frac{3}{4}$ inch from one another. The particles were allowed to remain on the sheet until solidified then removed.

The globular particles had a diameter (in the horizontal plane) of about $\frac{1}{8}$ inch and a height of about $\frac{1}{10}$ inch at the center. In shape they were as depicted in Fig. 2 of the accompanying drawing. The particles had a glassy appearance and microscopic examination disclosed that they were composed of a solid amorphous sugar phase with minute globules of orange oil uniformly distributed throughout the continuous sugar phase. The particles had a dry slippery feel, not being tacky and could be poured from one container to another like so much buck shot or gravel.

EXAMPLE II

A mixture of 90 parts dextrose and 10 parts levulose was melted by heating to about 160° C. The resulting liquid sugar base was cooled to about 108° C. and 5 parts of orange oil was incorporated therein with vigorous agitation. The hot emulsion was formed into globular particles as described in connection with Example I. The globular particles were in the amorphous state and had a non-tacky smooth surface.

EXAMPLE III

A quantity of fresh orange juice was concentrated under vacuum to produce a seven-fold concentrate. This concentrate was then reduced to dryness by subjecting a thin layer of the concentrate to vacuum dehydration using conditions to cause puffing of the concentrate during dehydration (as disclosed in the patent application of S. I. Strashun filed June 4, 1952, Serial No. 291,817). The dehydrated orange juice was broken up into flakes and to it was added sufficient of the product of Example I to furnish about 0.08% of orange oil in the composite product. A sample of this product was reconstituted by addition of water and found to produce a reconstituted juice having a taste almost indistinguishable from fresh orange juice. Even after storage of the composite product for several months, it was found to form a juice of natural taste and odor. Further, on reconstitution it was found that some of the orange oil dissolved in the reconstituted juice and the remainder existed as minute globules suspended in and dispersed throughout the whole body of juice giving it a natural taste and appearance.

I. Preparation of the oil-base emulsion

As noted above in section (a), an initial step in the process of the invention involves formation of a hot emulsion of the volatile liquid flavoring agent in a liquefied carrier base, this base preferably consisting principally of a sugar or mixture of sugars. The emulsification step requires, basically, intimate mixing of the flavoring agent and sugar base in the presence of heat. A form of apparatus for accomplishing this end is described above in connection with the explanation of Fig. 1. As explained therein, it is preferred to prepare this emulsion in a continuous manner and immediately prior to extrusion of the emulsion from the orifice. In this way, vaporization and deterioration of the flavoring agent is minimized.

It is to be emphasized that the amorphous nature of the composition of this invention is an important facet of the invention. This situation can be explained as follows: If the molten mass of sugar and flavoring agent were to solidify by crystallization, the flavoring agent would not be stabilized nor be held securely by the crystal mass. Thus, because of the manner in which sugars crystallize, the solid would be a mass of sugar crystals with the flavoring agent existing mainly in channels or interstices in the crystalline mass. Many of these channels would provide the avenues by which the flavoring agent could vaporize from the composition and whereby air could contact the flavoring agent whereby to cause deterioration of the flavor. As a result, with a composition of crystalline nature, the flavoring agent would not be protected from vaporization nor from deterioration.

When proceeding in accordance with this invention, the flavoring agent is incorporated in a molten sugar base. At this point one has a liquid, emulsified mass in which the sugar base is the continuous phase and the flavoring agent is the dispersed phase, that is, the flavoring agent is uniformly dispersed throughout the body of the sugar base as minute globules. When this material is subsequently cooled, the same relationship is maintained, that is, the cooled product is a mass of now solid amorphous sugar with minute globules of the flavoring agent uniformly dispersed throughout the sugar base. This material is thus still an emulsion, though now in the solid state.

It is to be noted that this solidification is caused not by crystallization but simply by such a large increase in viscosity that the material will retain its shape—such a solid is in an amorphous state. The solidification which occurs is analogous to the setting of molten glass in which case cooling of the melt results in such a great increase in viscosity that the material is termed a solid. The product of this invention in the amorphous state has very desirable properties as to stabilizing the flavoring agent against vaporization and deterioration. Because the flavoring agent exists as minute globules dispersed in the amorphous matrix of the sugar base, the flavoring agent is protected from contact with the atmosphere so that vaporization and deterioration can not take place. In the products of this invention, there are no channels as in a crystalline product and hence no avenues are provided for escape of the flavoring agent or contact thereof with the atmosphere. An additional advantage of the globular, dispersed nature of the flavoring agent in the amorphous sugar base is that when the composition is contacted with water as in preparation for ultimate use, the flavoring agent is dispersed throughout the liquid mass as minute droplets suspended in the liquid. This means that the reconstituted juice or other liquid product has a natural appearance and a uniform flavor in all its parts.

Regarding the ingredients of the emulsion, one may employ many different volatile flavoring agents, for example, orange oil, lemon oil, grapefruit oil, lime oil, clove oil, peppermint oil, bay oil, cedarwood oil, apple essence, pear essence, pineapple essence, grape essence, peach essence, apricot essence, strawberry essence, raspberry essence, cherry essence, prune essence, plum essence, cinnamon oil, oil of nutmeg, oil of sage, oil of bitter almonds, cassia oil, teaseed oil, coffee essence, and so forth. Mixtures of different flavoring agents may of course by employed. In the case of fruit essences, such as those enumerated above, it is preferable to first purify them to remove water and low-molecular weight alcohols by the process described in the patent application of K. P. Dimick and B. Makower, Serial No. 368,016, filed July 14, 1953. It is also preferred to add an edible oil and/or an edible emulsifying agent to the purified fruit essence so that it will emulsify properly with the molten sugar. Instead of or together with natural flavoring principles, synthetic flavoring agents may be employed. Examples are the edible flavor and aroma bearing aldehydes, alcohols, esters, ketones, phenols, and lactones, for instance, methyl anthranilate, decanal, nonanal, undecanal, cinnamic aldehyde, geraniol, menthol, methyl salicylate, phenylethyl alcohol, diacetyl, citronellol, citral, and so forth.

The proportion of flavoring agent to be incorporated in the sugar base may be varied depending on the flavor strength desired in the final product. Usually enough of the flavoring agent is added to furnish about from 5 to 25% thereof in the emulsion.

Regarding the sugar base, this material contains a sugar, or preferably a mixture of sugars and a minor proportion of a liquefying temperature depressant, as for example, water. Various sugars may be used, for example, sucrose, dextrose, maltose, levulose, lactose, mannose, galactose, etc. Preferably a mixture of sugars is used to ensure the formation of an amorphous mass when the liquid emulsion is cooled. For instance, if sucrose is selected as the basic ingredient one may incorporate with it a quantity, for example, from 10 to 50%, of a different sugar such as dextrose, corn sugar, invert sugar, corn syrup, solids, maltose, fructose, lactose, mannose, galactose, etc. Usually for practical purposes it is preferred to add about 33% of corn syrup or corn syrup solids. The use of a mixture of sugars rather than a single sugar also has the advantage that the mixtures will liquefy at a lower temperature than will the individual sugars. A lower liquefying temperature is desirable in that the flavoring agent can be incorporated with the sugar base at a lower temperature without danger of crystallization while stirring in the flavoring agent. Further, incorporation of the flavoring agent at a lower temperature minimizes vaporization and/or deterioration of the flavoring agent and prevents caramelization of the sugar base.

As pointed out above, to lower the melting point of the sugar and to ensure formation of an amorphous solid product, it is preferred to add a different sugar to the one chosen as the major constituent. However other agents can be added to the individual sugar or mixture of sugars to lower the liquefaction temperature and/or to ensure formation and maintenance of the amorphous solid state. Such agents are, for example, sorbitol, propylene glycol, glycerol, sodium gluconate, alphamethyl glucoside, dextrin, delta-gluconolactone, or other non-toxic aliphatic polyhydroxy compound. The proportion of the agent to be added may be from about 1% to about 20%, depending on the efficacy of the particular agent selected and the liquefying temperature desired. In the case of liquid additives such as propylene glycol, glycerol, etc., these should not be used in such high proportion as to cause the final product to be tacky. The proper amount to use in any particular case can be easily determined by conducting a few pilot trials with various proportions of the agent in question.

In many cases it is desired to add a small proportion of water, on the order of 1 to 10%, to the sugar base. The addition of water provides several advantages, as follows: The liquefying point of the sugar or sugars is decreased whereby the flavoring agent can be emulsified in the sugar base at a lower temperature whereby vaporization and/or deterioration of the flavoring agent is minimized. In addition, lowering the temperature decreases the possibility of charring or other deterioration of the sugar during the incorporation procedure. A further point is that addition of water decreases the viscosity of the mixture so that incorporation and emulsification can take place more readily and efficiently. Where water is utilized as the liquefying temperature and viscosity depressant, it is convenient to first dissolve the sugar components in the least amount of water necessary to form a solution and then boil the resulting solution until it reaches a solids content high enough so that on cooling to room temperature it will form a hard glassy mass.

In forming the emulsion of flavoring agent and sugar base, it is of course necessary to apply heat to form a liquid emulsion. The temperature to be applied will depend mainly on the character of the sugar base and usually it is preferred to use as low a temperature as will liquefy the sugar base and yield an emulsion fluid enough so that the flavoring agent can be incorporated in and to yield an emulsion fluid enough to be readily pumpable through the orifice. In general temperatures on the order of 80° to 150° C. are used. In many instances it is necessary to initially apply a higher temperature to the sugar base alone to liquefy it; the liquefied base can then be cooled to the above range without solidifying and mixed with the flavoring agent. The presence of small amounts of water (or organic liquefying temperature depressant) or the use of mixtures of sugars are useful to permit this cooling to take place without solidification of the sugar base and without undue rise in the viscosity of the liquefied sugar base. For best results, the flavoring agent is incorporated into the sugar base without at the same time beating air into the mixture.

In any event, the presence of sugar crystals in the hot emulsion should be avoided as such crystals may act as nuclei which initiate undesired crystallization. To prevent occurrence of sugar crystals in the emulsion, it is generally preferred to melt the sugar base in one vessel and then pour or otherwise remove it to other equipment for further processing. In this way any sugar crystals will remain stuck to the sides of the melting vessel and will not contaminate the emulsion.

II. Extrusion of the hot emulsion

As noted briefly above in section (b), the hot liquid emulsion of the flavoring agent and the carrier base is extruded through an orifice into the atmosphere. In this procedure the rate of flow of the emulsion and the size of the orifice are so correlated that the hot emulsion issues from the orifice as a stream of droplets. By this is meant that the stream is not a continuous connected body but consists essentially of individual droplets which are completely independent of one another (not connected to one another). The orifice size is also selected so that the droplets will have the volume desired in the final product as the final product has essentially the same volume as these droplets. In general, the size of the orifice is selected to provide droplets having a diameter on the order of about from $\frac{1}{20}$ to $\frac{1}{8}$ inch. The pressure and orifice size to produce a droplet stream containing droplets of the desired dimensions will depend on many factors such as the specific ingredients of the emulsion, its temperature, its viscosity, its surface tension characteristics, and so forth. In any specific case the proper pumping rate and orifice size can be readily determined by conducting a few pilot trials under different conditions and observing the emerging stream to see if it is as desired.

Usually the droplet stream is permitted to issue from the orifice into the unmodified atmosphere. However for best results, it is preferred that the droplet stream emerge into an atmosphere having a low humidity. Thus the extrusion apparatus can be located in a room having air-conditioning equipment for maintaining the air in the room at low humidity, for example, from 0 to 10% relative humidity. The use of low humidity is desirable in that crystallization of the droplets is prevented and also tackiness and sticking together of the globular particles is minimized. The low humidity ensures the production of a hard, glassy, amorphous product. Instead of air conditioning the whole room, a metallic conduit, considerably larger in diameter than the droplet stream, may be provided through which the droplets fall to the cold surface. Through this conduit is circulated air at low humidity.

III. Formation of the globular particles

As noted above in section (c), the droplets issuing from the orifice, while still in a plastic condition are caused to impinge on a solid surface whereby the globular particles are formed. In this step the distance of fall of the droplets is an important consideration. It has been observed that in most cases the droplets are in best condition for formation of the globular particles after falling a short distance on the order of about from $\frac{1}{2}$ to 8 inches, preferably 1 to 2 inches. When the droplets impinge on the surface after such a distance of fall, they form globular particles and are not flattened or distorted as they might be were the distance of fall substantially greater. The exact distance of fall which gives best results, that is, leads to formation of a most nearly spherical particle, will vary depending on such factors as composition of the hot emulsion, temperature of the emulsion, viscosity and surface tension characteristics of the emulsion, size of the droplets and so forth. In any specific instance the formation of the globular particles can be noted while varying the distance between the end of the orifice and the surface on which the droplets impinge. This distance is then set so that the particles forming on the surface are as described herein.

As noted hereinabove it is preferred to cause the droplets to impinge on a moving solid surface. This surface can take the form of an endless, imperforate belt. A rotating drum having a polished surface of stainless steel, chromium, or the like is also suitable. It is also preferred to cool the surface by application of a refrigerated medium such as brine, air, etc. to cool the globular particles as they are formed and transported away from the site of impingement. The use of a dehumidified atmosphere about the cold surface is preferred as preventing the formation of dew or frost from the atmosphere on the surface. Such accumulation of moisture may tend to make the particles tacky or even promote crystallization of the amorphous sugar base. The specific temperature applied to the surface may be varied depending on the length and time of travel of the particles on the surface before they are disengaged. A short distance of travel or a faster rate of travel would require a lower surface temperature. In any event it is desirable that the globular particles be substantially solidified, that is, shape-retaining and non-tacky before they are disengaged from the surface. In general the surface may be cooled to a temperature from about minus 20 to about plus 20° C. It may also be noted that the rapid solidification which occurs when the droplets land on the cold surface is conducive to formation of the amorphous solid state. That is, the rapid cooling effect causes a "freezing" of the liquid mass in the same state in which it existed prior to contact with the cold surface. Thus the flavoring agent remains in the form of minute globules dispersed throughout the mass. Rapid cooling thus prevents crystallization and formation of channels filled with flavoring agent.

The finished product is preferably stored in sealed containers to ensure the particles remaining in an amorphous state and to prevent them from becoming tacky. To further prevent development of crystallinity and/or tackiness, the products are packed together with a desiccant. That is, the particles are placed in a sealed container which also contains, in a vapor-permeable packet of paper or the like, a desiccant such as calcium oxide, silica gel, montmorillonite, calcium sulphate, calcium chloride, etc. The desiccant serves to remove traces of moisture from the particles and thus maintains them in an amorphous, non-tacky condition so that they are in perfect condition for use at any desired time.

Having thus described the invention, what is claimed is:

1. A process for preparing a solid flavoring composition in the form of globular particles which comprises forming a hot, liquid emulsion of a volatile flavoring agent in a sugar base, forcing the hot liquid emulsion through an orifice into the atmosphere at such a rate that the emulsion issues from the orifice as a stream of droplets, causing the stream to impinge upon a solid surface while the droplets are still in a plastic condition whereby the impingement causes the droplets to form globular particles on the surface, cooling and solidifying the particles while on the surface, and collecting the particles from the surface.

2. A process for producing a solid flavoring composition in the form of generally globular particles which comprises forming a hot, liquid emulsion of a volatile flavoring agent in a sugar base, forcing the hot liquid emulsion through an orifice into the atmosphere at such a rate that the emulsion issues from the orifice as a stream of droplets, causing the droplets to descend in free fall and impinge upon a solid surface while the droplets are still in a plastic condition whereby the impingement causes the droplets to form generally globular particles on the surface, cooling and solidifying the particles while on the surface, and collecting the solidified generally globular particles from the surface.

3. The process of claim 2 wherein the volatile flavoring agent is citrus oil.

4. The process of claim 2 wherein the distance of free fall of the droplets is about ½ to 8 inches.

5. The process of claim 2 wherein the droplets issue from the orifice into an atmosphere of low humidity.

6. The process of claim 2 wherein the flavoring composition, from the time of formation of the droplets to the time of collection of the globular particles, inclusive, is exposed to an atmosphere of low humidity.

7. The process of claim 2 wherein the droplets are formed to have a diameter from about 0.02" to about 0.2".

8. The process of claim 2 wherein the sugar base is a non-crystallizing mixture of at least two different sugars and a minor proportion of water.

9. A process for preparing a solid flavoring composition in globular form which comprises forming a hot, liquid emulsion of a volatile flavoring agent in a sugar base, continuously forcing the hot liquid emulsion through an orifice into the atmosphere at such a rate that the emulsion issues from the orifice as a stream of droplets, causing the stream to fall upon a solid surface while the droplets are still in a plastic state and after a distance of fall of from about ½ inch to about 8 inches, the impact of the droplets on the surface producing globular particles of the emulsion on the surface, continuously moving the surface in a direction essentially normal at the point of impact to the direction of stream fall whereby the globular particles are spaced along the surface, retaining the globular particles on the surface until they are solidified, then collecting the particles.

References Cited in the file of this patent

UNITED STATES PATENTS

| 1,512,730 | Washington | Oct. 21, 1924 |
| 2,310,463 | Russell | Feb. 9, 1943 |
| 2,404,763 | Gaver | July 23, 1946 |
| 2,429,042 | Bader | Oct. 14, 1947 |
| 2,429,907 | Zimmermann et al. | Oct. 28, 1947 |
| 2,558,204 | Wilson et al. | June 26, 1951 |
| 2,566,410 | Griffin | Sept. 4, 1951 |

FOREIGN PATENTS

| 9,669 | Great Britain | 1900 |
| 244,406 | Great Britain | Sept. 29, 1926 |